United States Patent
Dorn et al.

(10) Patent No.: US 9,960,603 B2
(45) Date of Patent: May 1, 2018

(54) INSTALLATION FOR TRANSMITTING ELECTRICAL POWER

(71) Applicant: SIEMENS AKTIENGESELLSCHAFT, Munich (DE)

(72) Inventors: Joerg Dorn, Buttenheim (DE); Hans-Joachim Knaak, Erlangen (DE); Peter Menke, Oberfuellbach (DE); Bernd Utz, Erlangen (DE); Michael Weinhold, Nuremberg (DE)

(73) Assignee: Siemens Aktiengesellschaft, Munich (DE)

( * ) Notice: Subject to any disclaimer, the term of this patent is extended or adjusted under 35 U.S.C. 154(b) by 118 days.

(21) Appl. No.: 15/105,066

(22) PCT Filed: Dec. 20, 2013

(86) PCT No.: PCT/EP2013/077785
§ 371 (c)(1),
(2) Date: Jun. 16, 2016

(87) PCT Pub. No.: WO2015/090465
PCT Pub. Date: Jun. 25, 2015

(65) Prior Publication Data
US 2017/0005478 A1 Jan. 5, 2017

(51) Int. Cl.
*H02J 3/38* (2006.01)
*H02J 3/32* (2006.01)
(Continued)

(52) U.S. Cl.
CPC ............. *H02J 3/386* (2013.01); *F03D 9/10* (2016.05); *F03D 9/257* (2017.02); *H02J 3/32* (2013.01);
(Continued)

(58) Field of Classification Search
CPC ....... Y02E 10/763; Y02E 10/766; Y02E 60/17; A01B 12/006; F03D 9/257; H02J 7/345; H02J 3/36; H02J 3/32; H02J 3/386
See application file for complete search history.

(56) References Cited

U.S. PATENT DOCUMENTS 7,218,014 B2   5/2007  Steinke
2005/0200133 A1   9/2005  Wobben
(Continued)

FOREIGN PATENT DOCUMENTS

CN   1639942 A   7/2005
CN   102545645 A   7/2012
(Continued)

OTHER PUBLICATIONS

S. Bernal-Perez et al., "Off-shore Wind Farm Grid Connection using a novel Diode-Rectifier and VSC-Inverter based HVDC Transmission Link", IECON, 2011, pp. 3186-3191.

*Primary Examiner* — Robert Deberadinis
(74) *Attorney, Agent, or Firm* — Laurence Greenberg; Werner Stemer; Ralph Locher

(57) ABSTRACT

An installation for transmitting electrical power between a first and a second alternating voltage network. A self-commutated converter can be connected to the second alternating voltage network, and is connected to a unidirectional rectifier by way of a direct voltage connection. The unidirectional rectifier can be connected to the first alternating voltage network on the alternating voltage side, and to a wind farm via said first alternating voltage network. The farm has at least one wind turbine feeding electrical power into the first alternating voltage network when wind speeds are greater than a switch-on wind speed. An energy-generating device can be connected to the first alternating voltage network and/or to the at least one wind turbine for providing electrical energy. The energy-generating device converts a (Continued)

renewable primary energy from its surroundings when wind speeds are lower than the switch-on wind speed for the wind turbine.

15 Claims, 2 Drawing Sheets

(51) Int. Cl.
    *H02J 15/00*     (2006.01)
    *F03D 9/10*     (2016.01)
    *H02M 7/06*     (2006.01)
    *H02M 7/44*     (2006.01)
    *F03D 9/25*     (2016.01)
    *H02J 3/36*     (2006.01)
    *H02J 7/34*     (2006.01)

(52) U.S. Cl.
    CPC ............. *H02J 15/003* (2013.01); *H02M 7/06* (2013.01); *H02M 7/44* (2013.01); *H02J 3/36* (2013.01); *H02J 7/345* (2013.01); *Y02E 10/72* (2013.01); *Y02E 10/763* (2013.01); *Y02E 10/766* (2013.01); *Y02E 60/17* (2013.01); *Y02E 60/60* (2013.01); *Y02E 70/30* (2013.01)

(56) References Cited

U.S. PATENT DOCUMENTS

| | | |
|---|---|---|
| 2011/0137481 A1 | 6/2011 | Manz et al. |
| 2011/0140511 A1 | 6/2011 | Larsen |
| 2011/0222320 A1 | 9/2011 | Delmerico et al. |
| 2012/0038210 A1 | 2/2012 | Kibbee |

FOREIGN PATENT DOCUMENTS

| | | |
|---|---|---|
| DE | 102007046239 A1 | 4/2009 |
| EP | 1318589 A1 | 6/2003 |
| EP | 2339713 A2 | 6/2011 |
| KR | 100993224 B1 | 11/2010 |

INSTALLATION FOR TRANSMITTING ELECTRICAL POWER

BACKGROUND OF THE INVENTION

Field of the Invention

The invention relates to an installation for transmitting electrical power between a first and a second alternating voltage network. A self-commutated converter which is connected via a direct voltage connection to a unidirectional rectifier can be connected to the second alternating voltage network. The unidirectional rectifier can be connected on its alternating voltage side to the first alternating voltage network and, via the first alternating voltage network, to a wind farm, wherein the wind farm comprises at least one wind turbine that is configured to feed electrical power into the first alternating voltage network at wind speeds above a switch-on wind speed.

Installations of this type are known from the prior art. For example, an energy transmission installation for use in wind turbines is disclosed in the article by S. Bernal-Perez et al., "Off-shore Wind Farm Grid Connection using a Novel Diode-Rectifier and VSC-Inverter based HVDC Transmission Link", IECON, 2011, pages 3186-3191. The energy transmission installation comprises a unidirectional converter implemented as a diode rectifier which is connected on its direct voltage side to an intermediate direct voltage circuit. The intermediate direct voltage circuit extends between the diode rectifier and a voltage-impressing converter which is also known as a "Voltage Source Converter (VSC)". The unidirectional rectifier is connected via transformers and an alternating voltage network to a wind farm of the wind turbine. Passive filter elements are connected to the alternating voltage network of the wind farm for the purposes of reactive power compensation.

The transmission of electrical energy with the help of direct current is economically advantageous in many applications, in particular with transmission routes of several hundred kilometers length.

These applications include, for example, the connection, already mentioned, of wind farms erected in the sea to a power network on the mainland, the supply of energy to offshore installations (such as oil platforms) from the land, and the connection of two mainland networks separated by a sea.

Two self-commutated converters, connected together by means of a direct voltage connection, are often employed in direct current transmission installations. Such an arrangement permits a bidirectional flow of power even between weak alternating voltage networks, so that, for instance, a stabilization of a weak alternating voltage network by a strong alternating voltage network can be achieved. Further, in this way it is also possible during phases of low wind, that is to say when the wind speed in the surroundings of the wind turbine is below the switch-on wind speed of the wind turbine, for the energy required to supply certain components of the wind turbine, such as for example a heating system, to be provided.

Self-commutated converters also permit the "ramp up" ("black start") of alternating voltage networks. If the wind speed in the surroundings of the wind turbine falls below the switch-on wind speed, the wind turbine is usually switched off, since energy production is not possible or not profitable at such wind speeds. If the wind speed rises, the wind farm first has to be "ramped up". To ramp up the wind farm an alternating voltage network can be created by the marine-side converter, where the supply of power required for this can be drawn from the land-side energy supply network. This energy can, in particular, also be used to align the wind turbine to the wind direction as the wind turbine ramps up. The wind turbine of the wind farm can, moreover, synchronize itself to the existing alternating voltage network. The desired reversal of the flow of power takes place at relatively strong wind, namely the transmission of power from the wind farm to the mainland energy supply network. At present, voltage-impressing and self-commutated converters (VSCs), and, in particular, multi-stage converters, are employed as the converter. The erection of such converters at sea is, however, expensive, due to the weight of the converter which is still great.

Although the use of a unidirectional rectifier only allows power to be transported in one direction, it does have the advantage that losses and the weight of the rectifier are significantly lower when compared to a self-commutated converter. In addition, relatively compact power semiconductors can be used in the unidirectional rectifier. The design of the control and cooling of the unidirectional rectifier can also, in some circumstances, be less burdensome.

Moreover, when connecting the first alternating voltage network to a wind farm, the direction of the power transport in normal operation is given, and consequently the restriction to unidirectional energy transfer does not represent a serious disadvantage.

The disadvantage of this concept is, however, that the unidirectional rectifier cannot provide any energy in low-wind phases, nor any alternating voltage for ramping up the wind turbine. For operation of the installation with commercially typical wind turbines, however, the presence of an alternating voltage with a stable frequency in the alternating voltage network to which the wind farm is connected is presupposed. This necessary alternating voltage cannot be provided by means of a unidirectional rectifier.

One possibility for overcoming this problem is the use of a specially adapted wind turbine regulation concept. In such a case, however, the commercially available wind turbines, with the usual regulation, could no longer be used.

The use of conventional diesel generators for the provision of energy during phases of low wind is also unfavorable for reasons of cost and environmental considerations.

BRIEF SUMMARY OF THE INVENTION

On the basis of the prior art, the object of the invention is that of supplying the wind farm with electrical energy using comparatively simple means, economically and reliably, with an installation of the type mentioned above.

The object is achieved by an installation comprising an energy generation device for the provision of electrical energy that can be connected to the first alternating voltage network and/or to the at least one wind turbine, wherein the energy generation device is configured to convert a renewable primary energy from its surroundings at wind speeds below the switch-on wind speed of the at least one wind turbine.

An advantage of the installation according to the invention is the possibility of the supply of electricity to the wind turbine of the wind farm even when the wind turbine is stationary, since sufficient electrical energy can be obtained from the primary energy in the surroundings of the energy generation device. Thus even when the wind turbine is not feeding any energy into the first alternating voltage network, due to the wind speed in the surroundings of the wind turbine being below the switch-on wind speed, the energy generation device can generate electrical energy and make it available for the supply of the wind turbine.

According to an advantageous form of embodiment of the invention, the energy generation device is configured to generate an alternating voltage in the first alternating voltage network. An alternating voltage network can thus be created when necessary, to which the wind turbine, as already explained above, can synchronize. It is also conceivable that the energy generation device makes energy available to the wind turbines over separate cables. By means of the energy made available, the wind turbines can start themselves and can supply the alternating voltage network.

The unidirectional rectifier is preferably a diode rectifier. Diode rectifiers have been found in practice to be particularly compact, and economical to manufacture and operate.

The installation according to the invention is particularly suitable for applications in which the electrical energy generated in an offshore wind farm, where the offshore wind farm is usually arranged several hundred kilometers from the shore in a sea or a lake, is to transmit energy into an energy supply network arranged on land. Since the energy transfer to land takes place in this case via a direct voltage connection, the unidirectional rectifier is preferably arranged on a deep-sea platform. The self-commutated converter is correspondingly arranged on land.

In a wind farm application, the energy generation device can, for example, be arranged together with the unidirectional rectifier on a deep-sea platform erected in the sea, wherein the energy generation device and the rectifier can also be arranged on two or more spatially separated platforms. It is also conceivable in this case that the energy generation device is housed on one of the pillars of the wind turbines.

According to one form of embodiment of the device according to the invention, the energy generation device comprises at least one low-wind turbine for the conversion of wind energy into electrical energy. Low-wind turbines of this sort are optimized for generating energy during phases of low wind. When the wind is strong, they are protected from damage through conventional measures (through mechanical braking, turning out of the wind, placing the blades of the turbine into the feathered position). A supply of energy from the low-wind turbines is no longer necessary after the wind turbine has started up. The low-wind turbine can, if this is expedient, be constructed in such a way that in strong wind, as a result of aerodynamic properties (stalling) only a small torque is generated.

It is deemed particularly advantageous if the at least one low-wind turbine is a vertical-axis wind turbine. A particular advantage of the vertical-axis wind turbine is that it does not first have to be aligned to the wind direction when starting up. For that reason the vertical-axis wind turbine can commence operation even at low wind strengths. The vertical-axis wind turbine can, for example, be a Darrieus turbine or a Savonius turbine.

According to another form of embodiment of the installation according to the invention, the energy generation device comprises at least one photovoltaic module with at least one photovoltaic cell for converting solar energy into electrical energy. This form of embodiment has the advantage that the energy generation device can provide electrical energy independently of the wind conditions in its surroundings.

According to a further form of embodiment of the installation according to the invention, the energy generation device comprises at least one thermal collector for converting solar energy into heat. The heat can be used directly for heating the wind turbine.

It appears furthermore advantageous for the energy generation device to comprise at least one flow turbine for converting kinetic marine energy into electrical energy and/or a wave energy converter for converting potential marine energy into electrical energy.

Advantageously, the energy generation device uses a plurality of the energy sources described above in order to achieve the highest possible reliability for the energy generation.

The energy generation device can, for example, be arranged on or in a nacelle of the wind turbine. If expedient, for example in the case that the flow turbine is used, at least a part of the energy generation device can also be arranged under the surface of the water, for example at a foot of a tower of the wind turbine, or at least partly arranged in the tower.

It is further particularly advantageous for the energy generation device to comprise at least one energy storage device. The energy storage device is provided here to store the energy generated by the energy generation device temporarily, so that it can be made available when required to operate the wind turbine. The energy store can, for example, comprise a rechargeable battery.

Preferably, the energy storage device is configured to store flotation energy of a flotation body. By means of the energy storage device, energy can be stored here in that a flotation body is lowered in the water. The energy can be extracted from the energy storage device, in that the flotation body is displaced in the direction of the water surface by the buoyancy force that acts on the underwater flotation body.

The flotation body can, for example, be raised and/or lowered by cable winch and pulley. In contrast to the known variants, no water has to be pumped here, which increases the efficiency of the energy storage device. Moving valves can, moreover, be omitted, and can, for example, be replaced by a simple standstill brake. The possibility of thermal problems that can arise when compressing or releasing air is also avoided.

It can be advantageous to use simple, cheap, plastic flotation bodies or containers that are open underneath. Preferably a plurality of flotation bodies are employed. The flotation bodies are here distributed across the offshore construction. They can be pulled downwards, for example by a pulling cable attached to each. The pulleys can be fastened to the sea bed and/or to foundations of the wind turbine. It is further possible to use typical cable winches used in ship construction that are attached to platforms above the water or in the offshore construction. It is also conceivable to arrange the flotation bodies within the foundation of the wind turbine. According to a further variant, the flotation bodies can be arranged as rings around the foundations of the wind turbine.

It is, however, also conceivable that a hollow body is used to store energy. The hollow body is here filled with water or with another suitable liquid. To remove energy, the body can be correspondingly emptied. To improve the energy storage capacity of the energy storage device it is conceivable that more than one hollow body is used.

It is also conceivable that the energy storage device comprises a massive weight element, wherein energy can be withdrawn from the energy storage device by lowering the weight element. The weight element can, for example, be arranged in the tower of the wind turbine or in the legs of an offshore platform.

It is, moreover, conceivable for the power converter for the cable winch drive to be connected directly to the intermediate circuit of a wind turbine. In this way the feed converter is advantageously omitted.

Further possible variants of the energy storage device can, for example, use a compressed-air, hydrogen or methane gas generator.

It is, moreover, conceivable for the energy storage device to be fed during normal operation of the wind turbine (at wind speeds above the switch-on speed). The wind turbine here makes the energy available via the alternating voltage network. The energy can, for example, be stored in an energy store that can be connected to an installation for reactive power compensation, for example what is known as a Static Synchronous Compensator (STATCOM). The installation for reactive power compensation can here preferably be connected on its alternating voltage side to the alternating voltage network, where the energy store is connected in parallel with a capacitor of the installation.

The energy generation device and/or the wind turbine can, moreover, be connected to an arrangement comprising at least one fuel cell, for example a hydrogen-oxygen cell. The production of hydrogen through electrolysis in the fuel cell preferably takes place when there is excess wind energy, and the generation of electricity by the fuel cell when there is a shortage of wind. In this way a particularly reliable supply of energy to the wind farm can be achieved. Excess hydrogen can, if necessary, for example be transported away by a suitable ship.

The self-commutated converter arranged, for example, on land can appropriately be a modular multi-stage converter. The modular multi-stage converter comprises phase modules whose number corresponds to the number of phases of the attached second alternating voltage network. Each phase module is here constructed as a three-pole unit, and comprises two outer direct voltage terminals and a central alternating voltage terminal. A phase module branch extends between the alternating voltage terminal and each of the direct voltage terminals and comprises a series circuit of two-pole submodules. Each submodule is fitted with an energy store, such as for example a unipolar capacitor, as well as with a power semiconductor circuit arranged in parallel with it. The power semiconductor circuit can, for example, be constructed as a half-bridge or full-bridge circuit. In the half-bridge circuit, a series circuit of two power semiconductor switches that can be switched on or off, such as for example IGBTs, IGCTs or the like is provided, where each power semiconductor switch that can be switched on and off has a freewheeling diode connected in parallel with it with the opposite polarity. A first submodule connecting terminal is here connected directly to one pole of the energy store, while the other submodule connecting terminal is connected to the potential node between the power semiconductor switches that can be switched on and off. In a full-bridge circuit, two series circuits each consisting of two power semiconductor switches that can be switched on and off are provided, where one sub module connecting terminal is connected to the potential node between the power semiconductor switches that can be switched on and off of the first series circuit and the second sub module connecting terminal is connected to the potential node between the power semiconductor switches that can be switched on and off of the second series circuit.

According to one form of embodiment of the invention, the unidirectional rectifier is cooled passively, for example by means of air cooling, where the cooling air can be brought to the parts that are to be cooled through suitable air channels. Convective oil cooling is also conceivable in this context. In wind farm applications, the available cooling capacity is well correlated with the power loss that is with the quantity of heat generated in the rectifier.

The unidirectional rectifier is expediently connected via at least one transformer to the marine-side alternating voltage network. The transformer is usually required, since the unidirectional rectifier necessitates a fixed, predetermined conversion ratio between the direct and alternating voltages that are present. The transformer furthermore provides potential isolation that may be required under some circumstances. It is moreover expedient to arrange a direct voltage smoothing choke in the direct voltage connection in the immediate neighborhood of the unidirectional rectifier. The smoothing choke can be used to reduce a residual ripple of the direct voltage generated at the direct voltage output of the unidirectional rectifier.

BRIEF DESCRIPTION OF THE SEVERAL VIEWS OF THE DRAWING

The invention is explained in more detail below with reference to an exemplary embodiment of the installation according to the invention illustrated in FIGS. 1 and 2.

DESCRIPTION OF THE INVENTION

Figure 1:
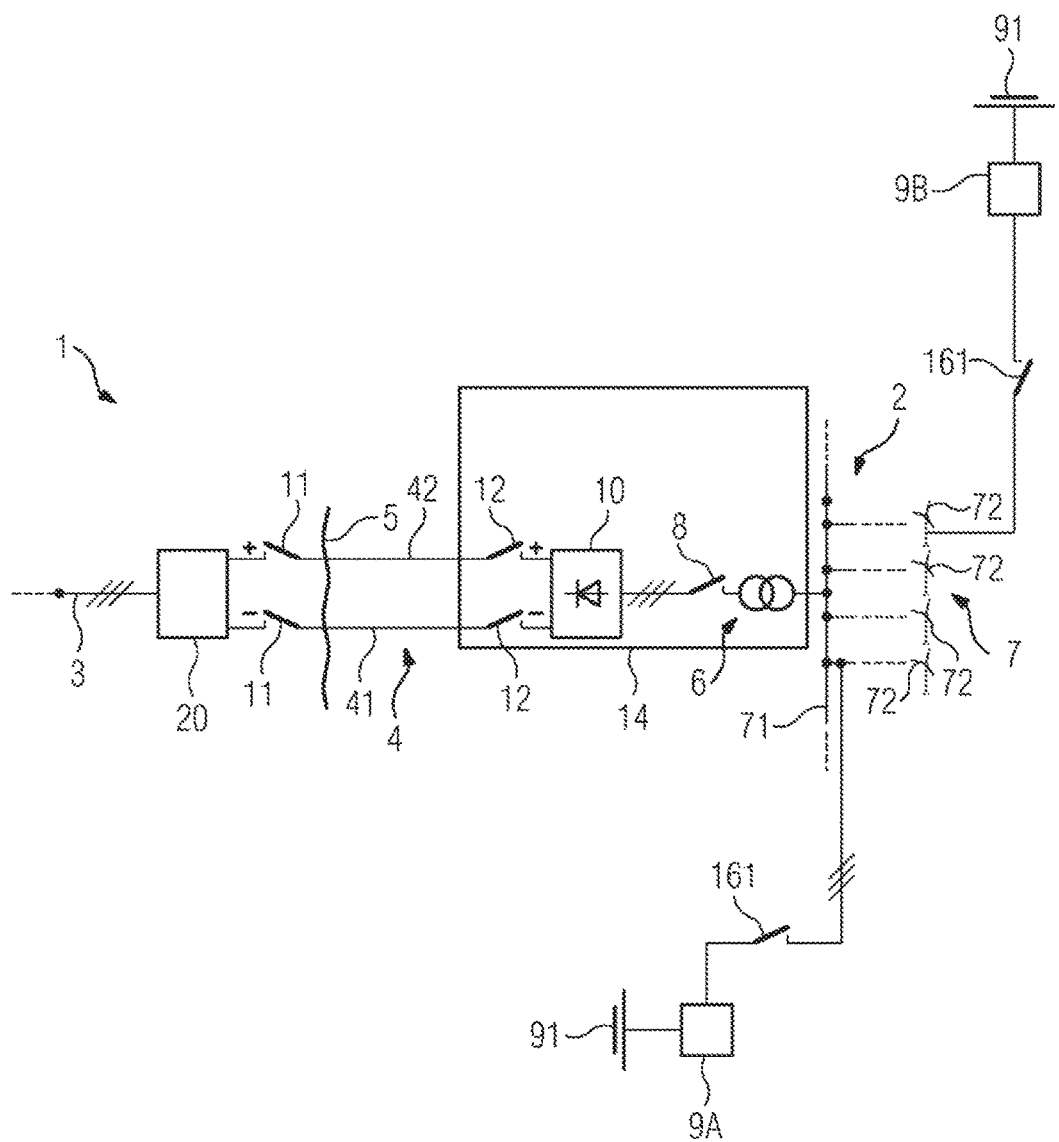
FIG. 1 shows a schematic illustration of an exemplary embodiment of an installation according to the invention for transmitting electrical power.

FIG. 1 shows a first marine-side alternating voltage network 2, which is coupled to a wind farm 7. The wind farm 7 is arranged in a sea, and comprises a plurality of wind turbines 72, which are provided to convert wind energy into electrical energy. The marine-side, first alternating voltage network 2 has a three-phase design.

According to the exemplary embodiment of FIG. 1, an installation 1 for transmitting electrical power comprises a diode rectifier 10. The diode rectifier 10 is connected on the alternating voltage side with the marine-side first alternating voltage network 2. The diode rectifier 10 can form what is known to the expert as a six-pulse-bridge, or may form a twelve-pulse-bridge, also known to the expert.

The diode rectifier 10 is connected on the direct voltage side to a direct voltage connection 4, wherein the direct voltage connection 4 comprises the direct voltage lines 41 and 42 which have opposite polarities. The direct voltage connection 4 is brought from the diode rectifier 10 arranged on the marine side to land, wherein the length of the direct voltage connection 4 can vary typically between 30 km and 300 km. The shoreline is suggested in FIG. 1 by the wavy line 5.

A self-commutated converter 20 is arranged on land, and is connected on the direct voltage side to the direct voltage connection. On the alternating voltage side, the self-commutated converter 20 is connected to a second, land-side alternating voltage network 3. The land-side alternating voltage network 3 is, in the example illustrated, an energy supply network to which a large number of consumers are connected. The alternating voltage network 3 is constructed with three phases. The direct voltage lines 41 and 42 each comprise two direct voltage switches 11 and 12, which are provided to interrupt the direct voltage lines 41 and 42. The direct voltage switches 11 and 12 are, for example, mechanical isolating switches or electronic power switches.

A switch 8 is furthermore provided in the first marine-side alternating voltage network 2, which is provided to isolate the alternating voltage network 2 from the diode rectifier 10.

Switch 8 is, for example, a power semiconductor switch.

The diode rectifier 10 is arranged on a deep-sea platform 14 that is erected on the seabed by means of platform legs.

The installation 1 further comprises a transformer 6 whose primary winding is connected to the alternating voltage terminal of the diode rectifier 10, and whose secondary winding is connected to a busbar 71, where the wind turbines 72 are also connected to the busbar 71.

In the installation 1 shown in FIG. 1 it is only possible for energy to be transferred unidirectionally from the wind farm 7 to the second alternating voltage network 3. During phases of low wind in particular, in which the wind speed in the surroundings of the wind farm 7 is lower than a switch-on wind speed of the wind turbines 72, energy cannot be transmitted from the wind farm into the second alternating voltage network 3. It can, however, be necessary, even during phases of low wind, to supply the wind farm 7 and the wind turbines 72 with energy. As soon as the wind farm 7 with the wind turbines 72 requires energy, for example to align the wind turbines 72, to align the rotor blades of the wind turbines 72, to provide energy for a heating system of the wind turbines 72, the power required for this is made available through a network generation device 9B. In the exemplary embodiment of the installation 1 according to the invention illustrated in FIG. 1, the energy supply device 9B is connected to one of the wind turbines 72 through a switch 161. The energy generation device 9B comprises a photovoltaic installation that can supply the wind turbine 72 with the necessary energy during phases of low wind. An energy storage element 91 is assigned to the energy generation device 9B, comprising in the exemplary embodiment illustrated a hollow body which can store energy through being lowered in the water. In this way an energy supply of the wind turbine 72 is ensured independently of wind conditions in the surroundings of the wind farm 7.

The installation 1 further comprises an energy generation device 9A which can be connected through a switch 161 to the first alternating voltage network 2. The energy generation device 9A is fitted with a plurality of vertical-axis wind turbines (not shown in the figure), which are configured to convert wind energy into electrical energy when the wind speed in the surroundings of the vertical-axis wind turbines is below the switch-on wind speed of the wind turbines 72. The energy generation device 9A can thus generate an alternating voltage in the first alternating voltage network 2, so that the wind turbines 72 can synchronize themselves to the first alternating voltage network 2 as they ramp up.

The energy generation device 9A has an energy storage element 91. In the example illustrated in FIG. 1, the energy storage element 91 is a rechargeable battery.

Figure 2:
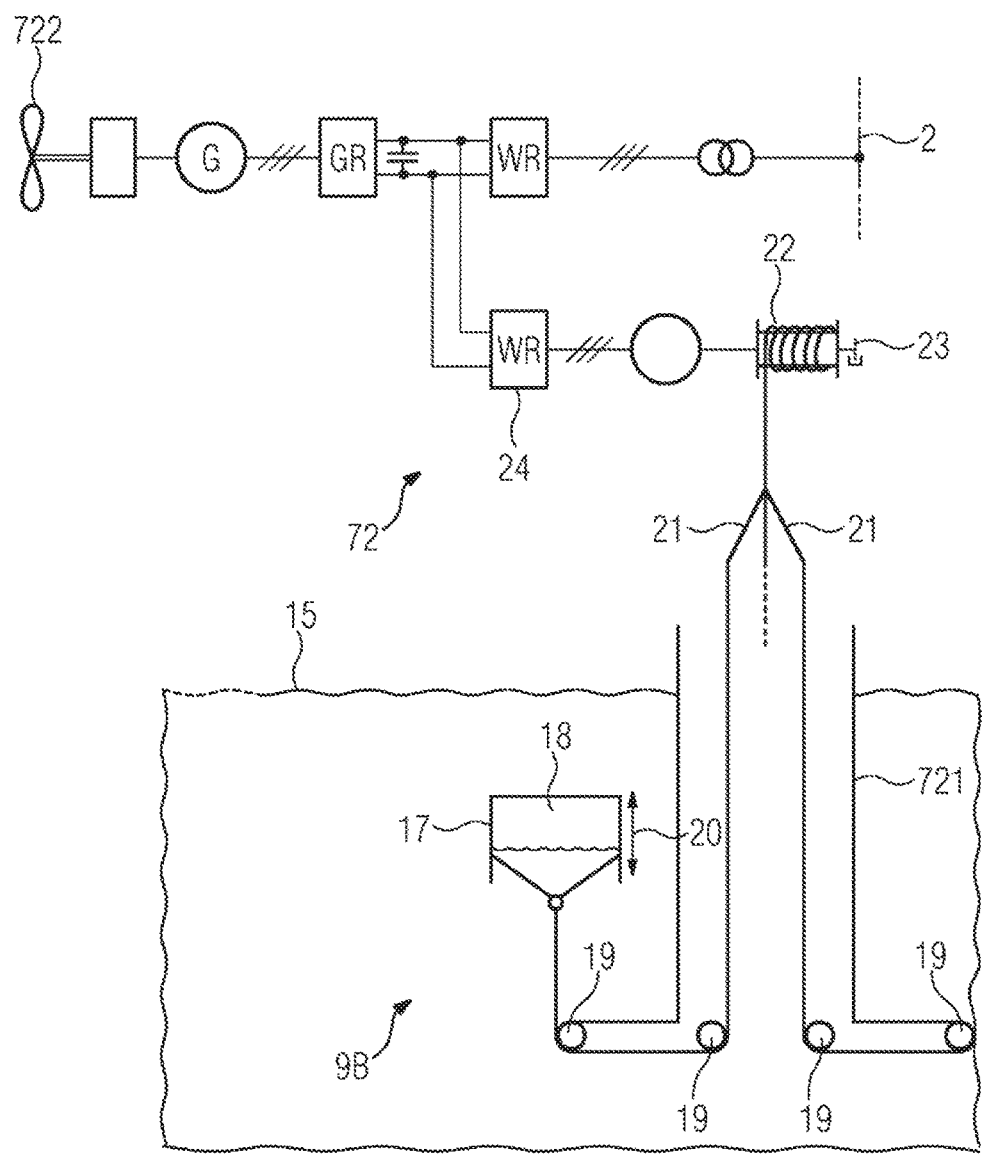
FIG. 2 shows a schematic illustration of an exemplary embodiment of an energy storage device of the installation according to the invention.

An exemplary embodiment of an energy storage device 91 assigned to the energy generation device 9B of the device 1 illustrated in FIG. 1 is shown schematically in FIG. 2. The energy storage device 91 is arranged at the foot of a tower 721 of the wind turbine 72. In normal operation of the installation 1, i.e. when the wind speed in the surroundings of the wind turbine 72 is above the switch-on wind speed of the wind turbine 72, the wind turbine 72 converts wind energy into electrical energy in the normal manner. The blades 722 of the wind turbine 72 are made to rotate by the wind. The captured rotation energy is converted into electrical energy by means of a generator G, where the generator G generates a three-phase alternating voltage. The alternating voltage is converted into direct voltage by means of a rectifier GR, and then converted by means of an inverter R into the desired alternating voltage. This alternating voltage is fed into the first alternating voltage network 2.

The energy generated by the wind turbine 72 can be stored by means of the energy storage device 91. The energy storage device 91 comprises a flotation body 17 which is a hollow container open underneath. Air is contained in a hollow space 18 of the hollow body 17. The hollow body 17 is arranged displaceably, which is suggested in FIG. 2 by a double arrow 20. The hollow body 17 is connected by means of a cable 21 to a reel 22. The hollow body 17 can be moved by winding the cable 21 onto the reel 22. The direction of movement of the hollow body 17 is determined by the pulley 19. The energy storage device 91 further comprises a standstill brake 23 which is configured to fix the reel 22. The hollow body 17 is arranged beneath the water surface 15. A buoyancy force acts on the hollow body 17 in the direction of the water surface 15. The movement of the hollow body 17 in the direction of the water surface 15 causes the reel 22 to rotate. This rotation of the reel 22 can be converted by a generator MG into electrical energy. The electrical energy obtained in this way can be supplied by means of an converter 24 to the wind turbine 72. The energy storage device 91 of the wind turbine 72 can correspondingly absorb energy when the wind speed in the surroundings of the wind turbine 72 is above the switch-on wind speed of the wind turbine 72. The storage of the energy by the energy storage device 91 is done by displacing the hollow body 17 against the buoyancy force that acts on it. In the exemplary embodiment illustrated in FIG. 2, the energy storage device 91 comprises a plurality of cables 21, by means of which the energy storage device 91 can be connected with other wind turbines 72 and/or with the photovoltaic installation, so that the energy transmission between multiple wind turbines 72 can take place.

| Table of reference signs | |
|---|---|
| 1 | Installation for transmitting electrical power |
| 2 | Second alternating voltage network |
| 3 | First alternating voltage network |
| 4 | Direct voltage connection |
| 41, 42 | Direct voltage line |
| 5 | Shoreline |
| 6 | Transformer |
| 7 | Wind farm |
| 71 | Busbar |
| 72 | Wind turbine |
| 721 | Tower |
| 722 | Blades |
| 8 | Switch |
| 9A, 9B | Energy generation device |
| 91 | Energy storage element |
| 10 | Unidirectional rectifier |
| 11, 12 | Direct voltage switch |
| 14 | Deep-sea platform |
| 15 | Water surface |
| 161 | Switch |
| 17 | Flotation body |
| 18 | Hollow space |
| 19 | Pulley |
| 20 | Double arrow |
| 21 | Cable |
| 22 | Reel |
| 23 | Standstill brake |
| 24 | Converter |
| G | Generator |

Table of reference signs

| | |
|---|---|
| GR | Rectifier |
| MG | Generator |
| WR | Inverter |

The invention claimed is:

1. An installation for transmitting electrical power between a first alternating voltage network and a second alternating voltage network, comprising:
 a self-commutated converter to be connected to the second alternating voltage network;
 a unidirectional rectifier having an alternating voltage side to be connected to the first alternating voltage network;
 a direct voltage connection connecting said converter to said unidirectional rectifier, said unidirectional rectifier to be connected via the first alternating voltage network to a wind farm, the wind farm having at least one wind turbine configured to feed electrical power into the first alternating voltage network at wind speeds above a given switch-on wind speed;
 an energy generation device for providing electrical energy to be connected to the first alternating voltage network and/or to the at least one wind turbine, said energy generation device being configured to convert a renewable primary energy from its surroundings at wind speeds below the given switch-on wind speed of the at least one wind turbine.

2. The installation according to claim 1, wherein said energy generation device is configured to generate an alternating voltage in the first alternating voltage network.

3. The installation according to claim 1, wherein said unidirectional rectifier is a diode rectifier.

4. The installation according to claim 1, wherein the wind farm is an offshore wind farm disposed in a lake or the sea.

5. The installation according to claim 4, wherein said unidirectional rectifier is disposed on a deep-sea platform and said self-commutated converter is disposed onshore on land.

6. The installation according to claim 4, wherein said energy generation device comprises at least one hydro-flow turbine or a wave energy converter for converting kinetic and/or potential marine energy into electrical energy.

7. The installation according to claim 1, wherein said energy generation device comprises at least one low-wind turbine for converting wind energy into electrical energy.

8. The installation according to claim 7, wherein said energy generation device comprises at least one vertical-axis wind turbine.

9. The installation according to claim 1, wherein said energy generation device comprises at least one photovoltaic module for converting solar energy into electrical energy.

10. The installation according to claim 1, wherein said energy generation device comprises at least one thermal collector for converting solar energy into heat energy.

11. The installation according to claim 1, wherein said energy generation device comprises at least one energy storage device.

12. The installation according to claim 11, wherein said energy storage device is configured to store flotation energy of a flotation body.

13. The installation according to claim 1, wherein said self-commutated converter is a modular multi-stage converter.

14. The installation according to claim 1, wherein said unidirectional rectifier is a passively cooled device.

15. The installation according to claim 1, which comprises at least one transformer connecting said unidirectional rectifier to the first alternating voltage network.

* * * * *